United States Patent [19]
Steimle
[11] 3,985,303
[45] Oct. 12, 1976

[54] HYDROMASSAGE DEVICE WITH DIRECTIONAL JET CONTROL

[76] Inventor: Wayne D. Steimle, 8808 E. Las Tunas Drive, San Gabriel, Calif. 91776

[22] Filed: Oct. 9, 1975

[21] Appl. No.: 621,048

[52] U.S. Cl. .............................. 239/428.5; 239/434; 239/587; 128/66; 285/261; 285/271

[51] Int. Cl.$^2$ ........................ B05B 7/04; B05B 15/08; A61H 9/00; F16L 27/06

[58] Field of Search .......... 239/8, 200, 201, 265.35, 239/340, 341, 428.5, 434, 587; 285/184, 261, 263, 271; 128/66, 370

[56] References Cited

UNITED STATES PATENTS

| | | | |
|---|---|---|---|
| 790,118 | 5/1905 | Everson | 285/271 |
| 1,167,355 | 1/1916 | Everson | 285/261 |
| 1,976,062 | 10/1934 | Estep | 239/428.5 X |
| 2,259,171 | 10/1941 | Miller | 285/271 |
| 3,038,469 | 6/1962 | Jacuzzi | 128/66 |
| 3,336,921 | 8/1967 | Lloyd | 128/66 |
| 3,383,051 | 5/1968 | Fiorentino | 239/587 X |
| 3,411,499 | 11/1968 | Jacuzzi | 128/66 |
| 3,605,735 | 9/1971 | Soden | 239/587 X |
| 3,677,474 | 7/1972 | Lorenzen | 239/587 |
| 3,745,994 | 7/1973 | Kane | 128/66 |

FOREIGN PATENTS OR APPLICATIONS

| | | | |
|---|---|---|---|
| 205,207 | 10/1923 | United Kingdom | 239/587 |

*Primary Examiner*—Robert S. Ward, Jr.
*Attorney, Agent, or Firm*—Sellers and Brace

[57] ABSTRACT

A hydromassage device for use in jetting air and pressurized water into a pool of water and including eyeball means readily adjustable at the user's option to direct the issuing jet in different directions. Existing non-adjustable hydromassage devices can be retrofitted with the adjustable eyeball, or the adjustable eyeball may be mounted directly in a socket of the main body of the massage device as manufactured.

12 Claims, 4 Drawing Figures

HYDROMASSAGE DEVICE WITH DIRECTIONAL JET CONTROL

This invention relates to hydromassage devices, and more particularly to an improved device of this type featuring a readily adjustable directional control for the issuing jet.

Prior hydromassage devices either of the type permanently installed in the sidewall of a pool or mounted in a portable unit adapted to be located in a bath tub or other pool of water lack simply-constructed readily-operated means for redirecting the issuing jet in a desired direction.

A portable hydromassage device having provision for redirecting the jet is shown in Jacuzzi U.S. Pat. No. 3,273,560 but this unit requires the venturi to be mounted in the nozzle proper and the construction further lacks any provision for retrofitting existing hydromassage devices to embody the directional feature.

As respects permanently installed hydromassage devices, my U.S. Pat. No. 3,628,529 shows an eyeball outlet clampable in different positions relative to the main axis in an attempt to change the axis of the issuing jet. However, it is readily demonstratable that this construction is quite ineffectual to vary the jet axis as the eyeball outlet port is rotated out of axial alignment with the venturi axis. Various manufacturers of hydromassage devices have proposed various adjustable eyeballs but with unsatisfactory results.

I have now discovered that these failures are due to the improper design of the flow passage through the eyeball and more particularly to the high losses and interference to fluid flow provided by the generally radial surfaces surrounding the inlet of the outlet port.

The foregoing and other shortcomings and disadvantages of prior hydromassage devices are overcome by the present invention which is equally suitable as a retrofit assembly for the outlet of existing hydrotherapy devices and as an adjustable nozzle embodied in new constructions of this type. The improved eyeball has a converging conical outlet port of substantially larger flow capacity than the venturi passage and is provided with a spherical exterior having a fluidtight seal in any adjusted position in a complementally shaped socket formed in the outer end of the main body. The inlet end of the conical passage is sufficiently large to lie outside the flow path of the intermixed air and water stream in all adjusted positions of the eyeball. In consequence interference to fluid flow is substantially eliminated in all positions of the eyeball and its conical bore is found highly effective and efficient in controlling the direction of the issuing jet stream.

Accordingly, it is a primary object of the present invention to provide an improved highly efficient low cost hydromassage device with simple means for adjusting the direction of the issuing jet.

Another object of the invention is the provision of a retrofit adjustable outlet jet unit for a hydromassage assembly.

Another object of the invention is the provision of a unitary eyeball mountable in the outlet of a hydromassage device and featuring a converging conical outlet passage.

Another object of the invention is the provision of an air injecting hydromassage unit made of molded plastic components and having a readily adjustable directional control for the issuing jet.

These and other more specific objects will appear upon reading the following specification and claims and upon considering in connection therewith the attached drawing to which they relate.

Referring now to the drawing in which a preferred embodiment of the invention is illustrated:

Figure 1:
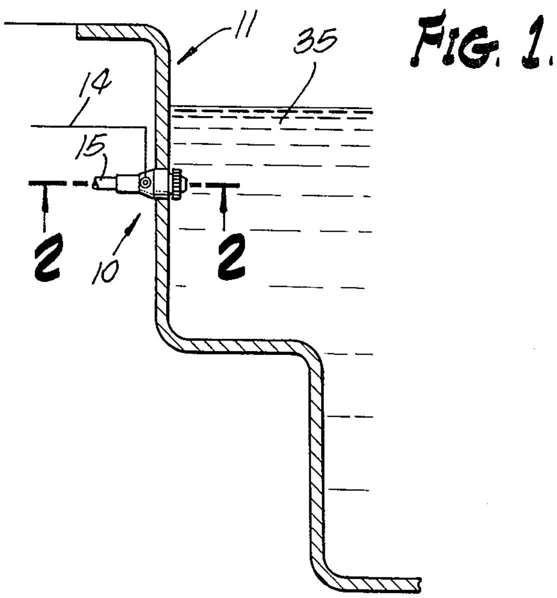
FIG. 1 is a fragmentary partial cross-sectional view showing a preferred embodiment of the invention installed in a pool wall.
Figure 3:
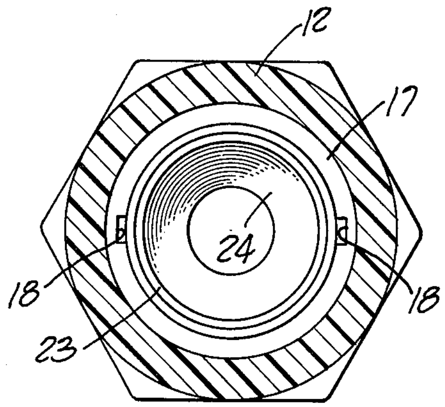
FIG. 3 is a cross-sectional view taken along line 3—3 of FIG. 2.
Figure 2:
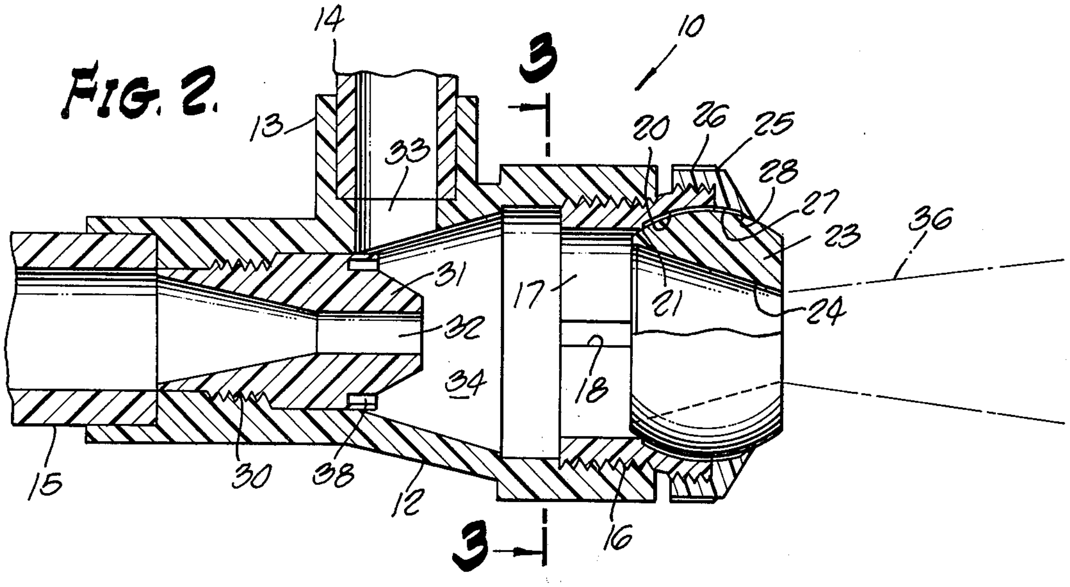
FIG. 2 is a fragmentary cross-sectional view on an enlarged scale taken along line 2—2 on FIG. 1.

Referring more particularly to FIGS. 1 and 2, there is shown a preferred embodiment of the invention hydromassage device, designated generally 10, shown permanently mounted in the sidewall 11 of a swimming pool. The device has a T-shaped tubular main body 12. The tubular stem portion 13 is connected to an air intake duct 14 the inlet end of which is in communication with the atmosphere at a point above the water level in the pool. The smaller left hand end of the T-head is connectable by duct 15 to a source of pressurized water, such as a municipal water main, whereas the larger right hand end of the T-head is threaded at 16 to receive a tubular retrofit coupling 17. The sidewall of this coupling is provided with one or more recesses 18 to seat an assembly tool usable to assemble and disassemble this coupling relative to the main body.

The outer end of coupling 17 is provided with a spherical socket 20 having at the inner smaller end thereof an inwardly projecting low height annular sealing rib 21, the purpose of which will be explained in greater detail presently.

Socket 20 receives and loosely seats an eyeball fitting 23 provided with a conical bore 24 which converges toward the outer discharge end thereof. This eyeball is held adjustably seated in socket 20 by a nut ring 25 engageable with threads 26 on the outer exterior end of coupling 17. The outer end half of this ring is formed with a spherical seat 27 and includes a low height sealing ring 28. Both of the annular sealing rings or ribs 21 and 28 are disposed to have a fluid tight sealing engagement with the outer periphery of the eyeball 23 when nut ring 25 is tightened thereagainst. The periphery of the nut ring is preferably knurled or roughened to facilitate gripping and turning the nut in either direction.

Removably mounted along the interior of the T-head portion of main body 12, as by threads 30, is a plastic venturi fitting 31 having a venturi passage 32 axially of the T-head. The smaller outlet end of the venturi is located radially adjacent the air inlet opening 33 to the air and water mixing chamber 34.

The operation of the hydromassage device will be readily apparent from the foregoing detailed description of its plastic components. Initially, conical passage 24 of eyeball 23 may be axially aligned with the venturi passage. When the pressurized water is supplied to the device the high velocity flow taking place through the venturi passage entrains a large volume of air into mixing chamber 34 from the atmosphere through intake duct 14 and opening 33. There the air and water are intermingled and ejected at high velocity through eyeball 23 and into the pool of water 35.

Figure 4:
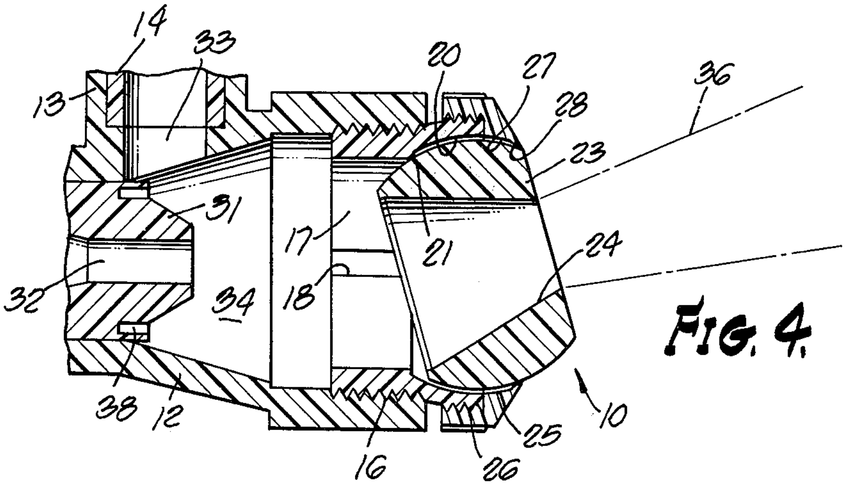
FIG. 4 is a fragmentary cross-sectional view similar to FIG. 2 but showing the eyeball adjusted upwardly relative to the venturi axis.

If the user wishes to have the jet 36 of air and water directed differently he merely loosens nut ring 25 sufficiently to permit free rotation of eyeball 23 into any desired position, such as that shown in FIG. 4. Jet 36 is then redirected from the horizontal path to the upwardly inclined path indicated in dot and dash line in FIG. 4. It is readily apparent that the jet stream can be redirected in a wide angular path in any selected direction other than the horizontal or venturi axis. Once the new position is obtained the user reclamps the nut ring 25 so that seals 21 and 28 cooperate in providing a fluid tight seal between the eyeball and the surrounding structure.

Although the eyeball has been illustrated as mounted in a retrofit coupling 17 suitable for insertion in existing hydromassage units, it will be understood that the retrofit coupling can be omitted and that the discharge end of the main body may be molded with a spherical socket and sealing rib. In this case the exterior of the discharge end of main body 12 is annular in shape rather than hexagonal and threaded to mate with the threads of nut ring 25.

It will be understood that in the device here shown all components of the massage device are molded from suitable tough plastic material including the venturi fitting 31. The discharge periphery of this fitting is preferably notched as indicated at 38 to receive the prongs of an assembly wrench. Accordingly, the venturi can be removed, serviced or replaced at any time simply by detaching ring 25 and eyeball 23, thereby providing free access to the venturi.

While the particular hydromassage device with directional jet control herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. That improvement in a hydromassage device for use under submerged conditions comprising: a tubular fitting provided with means for connecting the same to the submerged outlet of a pressurized water supply conduit, the outer end of said fitting having a spherical socket adjustably seating an eyeball water outlet fitting having a spherical exterior surface journalled in said socket and a conical bore therethrough which converges toward the outlet end thereof, and clamping ring nut means for holding said eyeball fitting in any of many adjusted positions wherein the axis of said conical bore is adjusted differently relative to the axis of said tubular fitting thereby to discharge a jet of water in any of many selected directions.

2. That improvement defined in claim 1 characterized in that each of the aforesaid components thereof is made of molded plastic material.

3. That improvement defined in claim 1 characterized in that the larger inlet end of said conical bore is substantially as large as the internal diameter of said tubular fitting.

4. That improvement defined in claim 1 characterized in that said tubular fitting is formed with screw threads at either end thereof, and the internal diameter of said tubular fitting having a recess for seating a wrenching tool therefor.

5. That improvement defined in claim 1 characterized in that the socket portion of said tubular fitting is provided with a low-height annular rib projecting inwardly and engageable with the juxtaposed surface of said eyeball fitting to form a sealing surface therewith as said ring nut means is tightened against said eyeball fitting.

6. That improvement defined in claim 1 characterized in that the internal diameter of said ring nut means has a low-height annular rib engageable with the juxtaposed exterior surface of said eyeball fitting to form a fluid-tight seal therewith.

7. That improvement in a hydromassage device of the type utilizing a flow of pressurized water through venturi means to entrain a stream of air for admixture therewith for discharge into a pool of water which improvement comprises: an eyeball fitting having a converging outlet bore generally aligned with the outlet of said jetting device, said eyeball fitting having a spherical exterior and including clamping ring nut means for holding the same firmly in any of many different positions relative to the axis of said venturi means thereby to divert the issuing stream of water and air along a selected axis lying at an angle to the axis of said venturi means.

8. That improvement in a hydromassage device as defined in claim 7 characterized in that both the inlet and outlet ends of the converging bore through said eyeball fitting are larger than the flow passage through said venturi means.

9. A hydromassage device comprising: a generally T-shaped tubular housing adapted to have one end of the T-head thereof connected to a source of pressurized water and provided between the ends thereof with a venturi passage, the other end of said T-head having spherical socket means adjustably seating spherical eyeball means which eyeball means has a converging outlet bore therethrough, and the T-stem portion of said housing being connectable to a source of air for admixture with rapidly flowing water issuing from said venturi and enroute to said eyeball means.

10. A hydromassage device as defined in claim 9 characterized in that said socket and eyeball means includes annular rib means providing a fluid-tight seal in each of various adjusted positions of said eyeball means.

11. A hydromassage device as defined in claim 9 characterized in that all components thereof are formed of molded plastic material.

12. A hydromassage device as defined in claim 11 characterized in that said venturi passage is formed by a tubular means supported interiorly of said I-shaped housing and removable therefrom after detaching said eyeball means.

* * * * *